US007894977B2

(12) United States Patent
Bauer et al.

(10) Patent No.: US 7,894,977 B2
(45) Date of Patent: Feb. 22, 2011

(54) METHOD FOR INCREASING THE RESOLUTION OF OUTPUT SIGNALS FROM AT LEAST ONE MEASURING SENSOR ON AN INTERNAL COMBUSTION ENGINE AND CORRESPONDING CONTROLLER

(75) Inventors: Erwin Bauer, Lappersdorf (DE); Dietmar Ellmer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 245 days.

(21) Appl. No.: 12/296,162

(22) PCT Filed: Jun. 22, 2007

(86) PCT No.: PCT/EP2007/056261

§ 371 (c)(1),
(2), (4) Date: Oct. 8, 2008

(87) PCT Pub. No.: WO2008/003600

PCT Pub. Date: Jan. 10, 2008

(65) Prior Publication Data

US 2009/0287389 A1 Nov. 19, 2009

(30) Foreign Application Priority Data

Jul. 4, 2006 (DE) ....................... 10 2006 030 842

(51) Int. Cl.
*B60T 7/12* (2006.01)

(52) U.S. Cl. ....................................... 701/114; 123/435

(58) Field of Classification Search ................. 701/101, 701/107, 114, 115; 123/434, 435, 690, 693–696, 123/479, 480; 73/114.16
See application file for complete search history.

(56) References Cited

U.S. PATENT DOCUMENTS

| | | | | |
|---|---|---|---|---|
| 4,459,847 | A * | 7/1984 | Kita | 73/114.35 |
| 4,893,501 | A | 1/1990 | Sogawa | 73/118.1 |
| 6,230,683 | B1 * | 5/2001 | zur Loye et al. | 123/435 |
| 6,915,776 | B2 * | 7/2005 | zur Loye et al. | 123/304 |
| 7,100,368 | B2 * | 9/2006 | Ito et al. | 60/287 |
| 7,142,973 | B2 * | 11/2006 | Ando | 701/112 |
| 2008/0125953 | A1 | 5/2008 | Bauer et al. | 701/103 |

FOREIGN PATENT DOCUMENTS

DE 38 39 721 A1 6/1989

(Continued)

*Primary Examiner*—John T Kwon
(74) *Attorney, Agent, or Firm*—King & Spalding L.L.P.

(57) ABSTRACT

The resolution of output signals from at least one measuring sensor on an internal combustion engine can be increased by: the working level range of the sensor is divided into at least two range sections, each section is provided with the same given output level range limited with relation to the working level range, for the output signal from the sensor and the switching from one to the other section is carried out independently by the sensor, when a range boundary between two adjacent sections is reached, exceeded or fallen below, the operating point of the internal combustion engine is determined by an engine management based on at least one parameter, the time curve for the raw sensor signal is predicted from at least one set of performance characteristics for the current operating point and the engine management determines which section is current from the predicted raw sensor signal time curve.

14 Claims, 3 Drawing Sheets

FOREIGN PATENT DOCUMENTS

| | | | |
|---|---|---|---|
| DE | 10 2005 009 104 | | 2/2005 |
| EP | 0 494 423 | A2 | 7/1992 |
| EP | 1 233 177 | A1 | 8/2002 |
| EP | 1 593 825 | A1 | 11/2005 |
| GB | 2 130 731 | A1 | 6/1984 |

* cited by examiner

METHOD FOR INCREASING THE RESOLUTION OF OUTPUT SIGNALS FROM AT LEAST ONE MEASURING SENSOR ON AN INTERNAL COMBUSTION ENGINE AND CORRESPONDING CONTROLLER

CROSS-REFERENCE TO RELATED APPLICATIONS

This application is a U.S. National Stage Application of International Application No. PCT/EP2007/056261 filed Jun. 22, 2007, which designates the United States of America, and claims priority to German Application No. 10 2006 030 842.5 filed Jul. 4, 2006, the contents of which are hereby incorporated by reference in their entirety.

TECHNICAL FIELD

The present invention relates to a method For increasing the resolution of output signals from at least one measuring sensor for an internal combustion engine.

BACKGROUND

For example, cylinder pressure sensors supply valuable data about combustion in internal combustion engines. From their respective pressure profile it is possible for example to determine the quantity of energy converted over time and the combustion center of gravity of an internal combustion engine. As well as the crankshaft angle of the internal combustion engine, cylinder pressure also represents a central input variable for cycle calculations for the combustion process of the respective internal combustion engine. For example in the case of 4-stroke internal combustion engines the combustion process/cycle is divided into a high-pressure and a low-pressure loop. This is shown schematically in the p-V (pressure/volume) diagram in FIG. 2. There the high-pressure loop is marked AS and the low-pressure loop LWS. The high-pressure loop AS is made up of a work curve K1 for the expansion and/or combustion phase of the cycle and a sub-curve K2, which represents the compression phase of the cycle. The sub-curve K3 of the low-pressure loop represents the exhaust phase of the cycle. The sub-curve K4 of the low-pressure loop LWS describes the behavior of the 4-stroke internal combustion engine during its intake stroke. The high-pressure loop AS and the low-pressure loop LWS differ from one another essentially in pressure level. While the low-pressure loop LWS lies in a pressure range of around 1 bar, the high-pressure loop AS can in extremis go up to three-figure numerical values for the pressure p. This is the root of the measuring problem. Pressure sensors, embodied as analog sensors, supply an electrical signal proportional to the physical variable, i.e. the pressure. This electrical signal is converted by an electronic unit (in particular an instrument transformer) to a voltage signal and optionally amplified. The voltage signal emitted respectively by the pressure sensor then lies within a typical sensor output voltage range for example between 0 and 5 volts. This voltage signal is conducted from the pressure sensor to the engine control device and processed there by an A/D converter (analog-digital converter) in a manner appropriate for the processor. 8, 10 or 12 bit converters are generally used depending on the required accuracy. Higher resolution converters are rarely used in automotive engineering for EMC (electromagnetic compatibility) reasons. As the respective pressure sensor is expediently designed for a pressure range that can occur as a maximum in the respective cylinder of the internal combustion engine, low pressure values can only be reproduced approximately, even though a higher resolution could be supplied by the sensor element of the pressure sensor. For example with an 8-bit A/D converter, which can therefore display 356 measurement points, and an output voltage range between 0 and 5 volts for the pressure sensor, a resolution of 5 volts/256=19 mV results. In contrast the sensor element of the pressure sensor has a physically smallest resolution of around 1 mV for example. This means that the output signals from the pressure sensor can only be detected and/or registered from 19 mV due to the small number of measurement points for A/D conversion. The lower measuring range from 0 to 18 mV of the pressure sensor—corresponding in theory to 19 measurement values of the sensor element of the pressure sensor—remains unused despite higher resolution of the sensor element and cannot therefore be detected. In other words, it results in too low a resolution for the output signal of the cylinder pressure sensor.

One common option for improving A/D conversion would be to use a 10-bit converter instead of an 8-bit converter, in other words an A/D converter with more bits of conversion. In automotive engineering however—as described above—there are clear limits for the deployment of such measures. Another option would be to split the overall measuring range, for example into a low-pressure and a high-pressure range. For example the output voltage of the pressure sensor between 0 and 5 volts could be assigned a first measuring range between 0 and 2 bar and a second measuring range between 2 and 100 bar for the pressure in the respective cylinder. The pressure sensor would then have to be notified by a control signal from the engine controller or the engine control device which measuring range is currently active. Alternatively the pressure sensor could also switch independently between its various measuring ranges and notify the engine controller of the respectively activated measuring range via an additional control line. However this would be too complex in some practical motor engineering circumstances with regard to the signaling outlay between the internal combustion engine and the engine controller or control device. Such resolution and accuracy problems also occur in some instance with other measuring sensors, which are provided for the combustion process of an internal combustion engine.

SUMMARY

A way can be demonstrated in which the per se high resolution of the sensor element of a measuring sensor can be used more efficiently in a simple manner despite inadequate A/D conversion of its output signal.

According to an embodiment, a method for increasing the resolution of output signals from at least one measuring sensor for an internal combustion engine, may comprise the steps of:—dividing the working level range of the measuring sensor, within which the level values of its raw sensor signal lie, into at least two measuring range segments,—assigning the same predefined output level range of the output signal of the measuring sensor, which is limited compared with the working level range, to each measuring range segment, with the switch from one measuring range segment to the other being carried out independently by the measuring sensor, when a measuring range boundary between two adjacent measuring range segments is reached, exceeded or fallen below,—determining the operating point of the internal combustion engine by means of an engine controller based on at least one operating parameter for its combustion process,—predicting the temporal profile of the raw sensor signal of the measuring sensor from at least one performance characteristic information item for the currently determined operating point, and—determining by the engine controller which measuring range segment of the measuring sensor is currently activated based on this predicted temporal raw sensor signal profile.

According to a further embodiment, a cylinder pressure sensor, which is attached to at least one cylinder of the internal combustion engine, may be used as the measuring sensor and a voltage signal may be generated by the cylinder pressure sensor as the raw sensor signal, representing the internal pressure in the cylinder. According to a further embodiment, the predicted raw sensor signal profile may have been stored previously as a performance characteristic in the engine controller. According to a further embodiment, the predicted raw sensor signal profile may be calculated in the engine controller. According to a further embodiment, the switch from one measuring range segment to another measuring range segment may be carried out subject to hysteresis. According to a further embodiment, a division into at least two level range segments, which corresponds essentially to the division of the measuring range segments of the measuring sensor, can be carried out in the engine controller for the predicted raw sensor signal profile. According to a further embodiment, based on the time intervals, which are assigned to the level range segments as periods of validity in the predicted raw sensor signal profile, it may be estimated when which measuring range segment of the measuring sensor is switched to active and the actual signal level profile of the raw sensor signal is reconstructed from the level-limited output signal of the measuring sensor and this estimated temporal assignment of the associated active measuring range segment. According to a further embodiment, the difference between the period of validity of the respective level range segment of the predicted raw sensor signal profile and the period of validity of the level-limited output signal of the measuring sensor may be used to correct the prediction of the raw sensor signal profile adaptively for the next estimation.

According to another embodiment, a control device with at least one calculation unit may execute steps as described above to increase the resolution of output signals from at least one measuring sensor for an internal combustion engine.

BRIEF DESCRIPTION OF THE DRAWINGS

The invention and its developments are described in more detail below with reference to drawings, in which.

Elements with the same function and mode of operation are marked with the same reference characters in FIGS. 1 to 3.

DETAILED DESCRIPTION

According to an embodiment, in a method for increasing the resolution of output signals from at least one measuring sensor for an internal combustion engine, the working level range of the measuring sensor, within which the level values of its raw sensor signal lie, is divided into at least two measuring range segments, the same predefined output level range of the output signal of the measuring sensor, which is limited compared with the working level range, is assigned to each measuring range segment, with the switch from one measuring range segment to the other being carried out independently by the measuring sensor, when a measuring range boundary between two adjacent measuring range segments is reached, exceeded or fallen below, the operating point of the internal combustion engine is determined by means of an engine controller based on at least one operating parameter for its combustion process, the temporal profile of the raw sensor signal of the measuring sensor is predicted from at least one performance characteristic information item for the currently determined operating point and the engine controller determines which measuring range segment of the measuring sensor is currently activated based on this predicted temporal raw sensor signal profile.

This means that there is no need for complex control lines between the control device and the respective measuring sensor, which would otherwise be required to provide information about the switch between the various measuring range segments. It is therefore not necessary to transmit measuring range segment information between the measuring sensor and the control device. Additional signal generation or transmission by way of additional signal lines is therefore not necessary. This makes determination of the actual raw sensor signal profile simple and efficient, which is advantageous in particular when evaluating cylinder pressure signals. Also compared with the instance without measuring range division, the resolution with which the output signal of the measuring sensor can be detected and processed, thereby also improving the signal accuracy, is now advantageously increased to such a degree in particular that it is possible essentially to achieve the signal accuracy available with one or more additional signaling lines between the control device and the measuring sensor.

According to another embodiment, a control device with at least one calculation unit may execute steps as described above to increase the resolution of output signals from at least one measuring sensor for an internal combustion engine.

Figure 1:
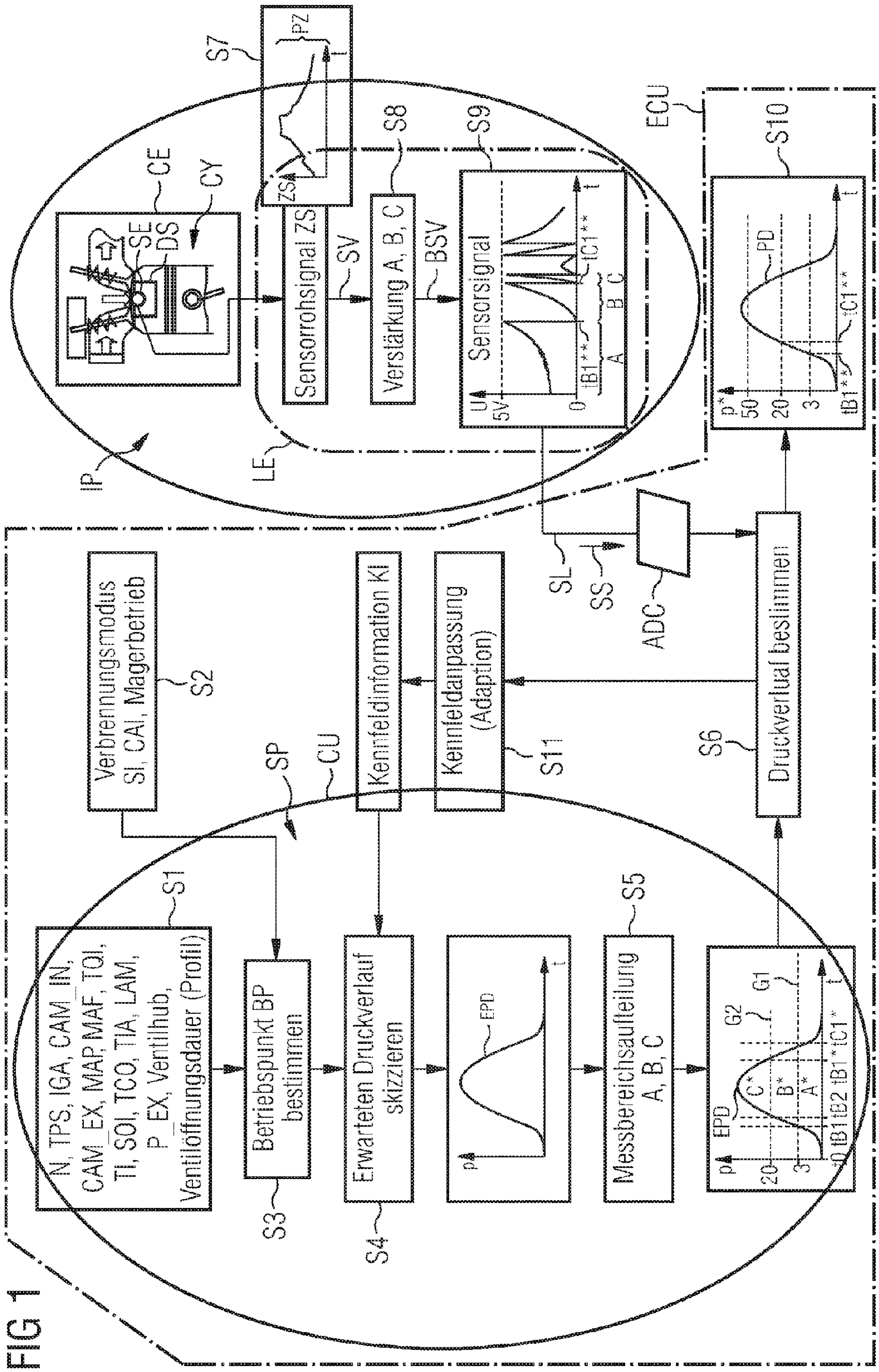
FIG. 1 shows a schematic diagram of an exemplary embodiment of the method for increasing the resolution, with which the actual cylinder pressure profile in a cylinder of an internal combustion engine can be detected by means of a cylinder pressure sensor.

FIG. 1 shows a schematic diagram of advantageous control steps of the calculation unit CU, of an engine control device ECU for an internal combustion engine CE, in order to be able to detect the cylinder pressure signal of a cylinder pressure sensor DS according to an embodiment with better resolution, in other words more accurately. The cylinder pressure sensor DS here is positioned in particular on the cylinder head of a cylinder CY of the internal combustion engine CE. It has a sensor element SE, which serves to detect the internal pressure in the combustion chamber of the cylinder CY. It is preferably configured as an analog assembly and in step S7 generates a raw sensor signal ZS, which is representative of the pressure respectively present in the interior of the cylinder CY during the cyclical combustion process of the internal combustion engine CE. It is assigned an evaluation/logic unit LE for further processing of the raw sensor signal ZS. This is preferably part of the cylinder pressure sensor DS. Alternatively it can also optionally be provided as a separate component. In FIG. 1 it is shown separate from the sensor element SE of the pressure sensor DS to illustrate its functionality more clearly.

The evaluation/logic unit LE of the cylinder pressure sensor DS divides the raw sensor signal ZS into at least two measuring range segments in process step S8 to increase its resolution for a subsequent A/D conversion. In the exemplary embodiment in FIG. 1 the evaluation/logic unit LE in particular predefines three measuring range segments A, B, C. This measuring range division for the raw sensor signal ZS serves to scale its level to a reduced or limited level range, in other words level limitation is carried out. In this exemplary embodiment the sensor element SE of the cylinder pressure sensor DS generates as the raw sensor signal ZS an electrical voltage signal, whose voltage level range for each measuring range segment A, B, C is limited for example to voltage values between 0 and 5 volts. The cylinder pressure sensor DS therefore supplies an electrical signal assigned to the internal pressure of the cylinder CY, in particular an essentially proportional electrical signal, as the raw sensor signal ZS, which is converted by the evaluation/logic unit LE, in particular by an electronic evaluation unit, such as an instrument transformer for example, to a voltage signal SV, and thereby optionally amplified. This voltage signal SV is scaled by division into the various measuring range segments, e.g. A, B, C, in other words its original dynamic range is limited to a specified voltage level range. A characteristic scaling factor or offset is hereby assigned to each measuring range segment A, B, C in relation to a reference value, e.g. 0V, by means of which it can be transferred to the predefined limited level range. This means that a modified output sensor signal BSV is present at the output of the cylinder pressure sensor DS in step 9, being mapped for the various predefined measuring range segments A, B, C respectively onto the same output voltage level range, in this instance between 0V and 5V. In the exemplary embodiment in FIG. 1 in step 9 an exemplary temporal profile of the output voltage U of the modified sensor output signal BSV is mapped as a function of time t. The same output voltage level range between 0 and 5V (volts) is assigned to each measuring range segment A, B, C. In other words the various measuring range segments A, B, C of the original raw sensor signal ZS are converted to one and the same predefined level dynamic range for the sensor output signal SS. This means that the sensor output signal SS has a level dynamic range in the actual path IP of the cylinder pressure sensor DS, which is reduced compared with the original raw sensor signal ZS.

This sensor output signal SS is transmitted to the engine control device ECU by way of a measuring line SL. It is digitized there with the aid of an A/D converter ADC. An 8-bit converter is preferably used here in the exemplary embodiment as the A/D converter.

A corresponding measuring range segment division can similarly be carried out, if the evaluation/logic unit LE outputs an electric current as a measure of the internal pressure in the combustion chamber of the cylinder CY measured by the sensor element SE as an alternative to an electrical voltage.

Figure 2:
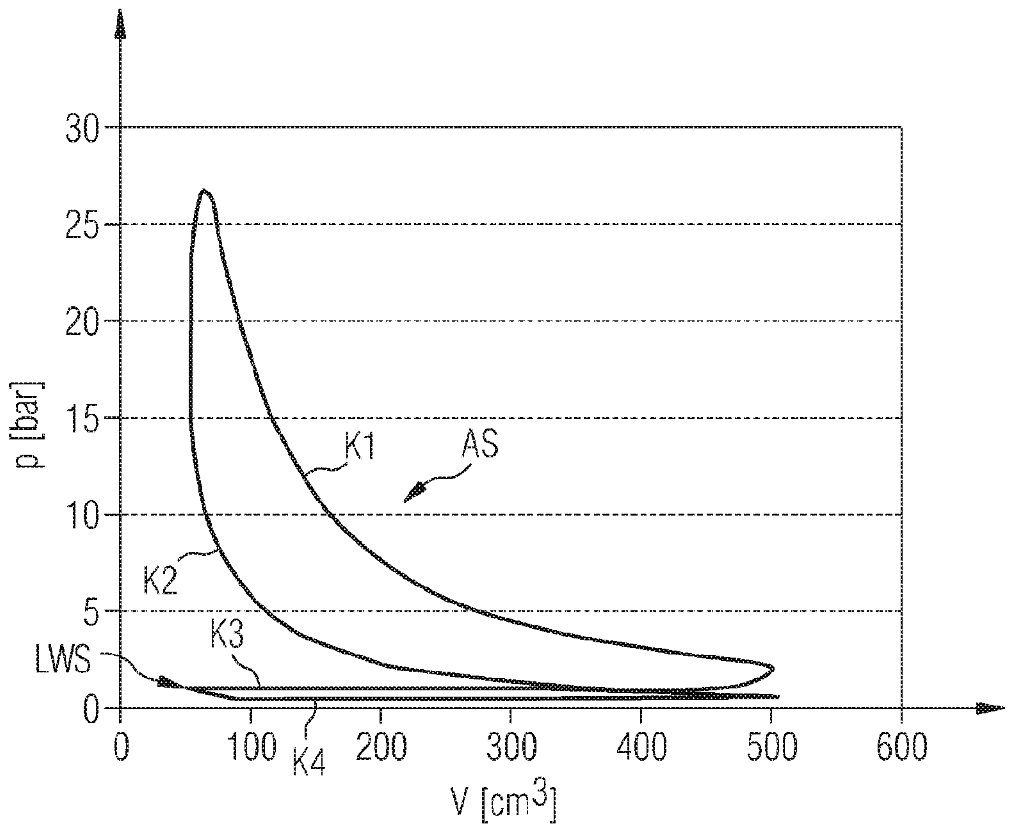
FIG. 2 shows a schematic diagram of an example of a p-V diagram for the cycle of a 4-stroke internal combustion engine and FIG. 3 shows a schematic diagram of a level-limited signal profile of the output signal of the cylinder pressure sensor from FIG. 1 together with the cylinder pressure profile determined or in other words reconstructed according to the exemplary embodiment in FIG. 1, as a function of the crankshaft angle of the internal combustion engine.

So that the engine control device ECU can now reconstruct the actual temporal profile of the raw sensor signal ZS and therefore the actual pressure in the cylinder CY during its combustion cycle from the temporal profile of the received, level-limited sensor output signal SS, the engine control device ECU estimates an expected temporal cylinder pressure profile EPD in the target path SP. To this end the current operating point of the combustion cycle is determined for the cylinder CY. This is carried out in process step S3 in FIG. 1. The engine control device ECU uses one or more different operating parameters of the internal combustion engine CE for this purpose. In particular the rotation speed N of the crankshaft of the internal combustion engine CE and the disk angle TPS of its throttle valve hereby determine the current operating point BP for the cyclical combustion process. In other words it is possible to determine from these operating parameters the working point of the p-V (pressure/volume) diagram in FIG. 2 where the cylinder CY currently is. Further expedient operating parameters of the internal combustion engine CE for determining the current operating point BP for the cylinder VY can in particular be one or more parameters of the following characteristic variables, which influence the combustion process of the cylinder CY in a characteristic manner: ignition angle position IGA, inlet camshaft position CAM_IN, outlet camshaft position CAM_EX, intake manifold pressure MAP, air mass MAF in the intake manifold of the internal combustion engine CE, indexed engine torque TQI, injection time TI, start time of respective injection SOI, coolant temperature TCO, intake air temperature TIA, lambda value LAM, exhaust gas back pressure P_EX, valve lift, valve opening period, profile of respective valve opening of respective valve at cylinder CY.

In the exemplary embodiment in FIG. 1 these operating parameters are available to the calculation unit CU as input signals S1. At the same time it is also taken into account according to an interrogation step S2 which combustion mode is currently present. A distinction is made here in particular between spark ignition SI, controlled auto ignition CAI and lean operation.

In control step S4 the currently determined operating point BP of the internal combustion engine CE is now used to predict the temporal pressure profile in the respective cylinder CY based on stored performance characteristic information KI. For a plurality of different operating points the performance characteristic information KI contains performance characteristics, which indicate a pressure profile as a function of the crankshaft angle, preferably as a function of the respective crankshaft rotation speed N and the respective throttle valve angle TPS. The crankshaft angle can hereby be mapped onto the temporal profile t of the pressure p in the cylinder CY. An estimated pressure profile EPD therefore results for the currently determined operating point BP, demonstrating the functional relationship between the level values of an expected internal pressure p in the cylinder CY as a function of the time t. In FIG. 1 an expectation curve is shown schematically and by way of example for the estimated cylinder pressure profile EPD in a p/t (pressure/time) diagram. The predicted or estimated cylinder pressure signal EPD is divided in respect of its level dynamic by thresholds G1, G2 into the same level measuring ranges A*, B*, C*, as carried out regardless, in other words independently of the evaluation/logic unit LE of the cylinder pressure sensor DS, in respect of the measuring range segments A, B, C. In other words different level thresholds G1, G2 are determined for the predicted pressure profile EPD so that the three level ranges A*, B*, C* are formed separately by them. This is carried out in step S5 in FIG. 1. The point of intersection between the respective threshold and the predicted pressure profile EPD for the estimated internal pressure p now determines a respective time interval, which unambiguously indicates the presence of a specific measuring range segment A, B, C in the logic/evaluation unit LE of the cylinder pressure sensor DS. For example the time interval between t0=0 and the time TB1, at which the first threshold G1 intersects the rising branch of the estimated pressure profile curve EPD, is assigned to the lowest level measuring range A*. This time interval t0 to tB1 then characterizes the presence of the first measuring range segment A on the sensor side. The time interval between the times tB1 and tC1 is assigned as the period of validity in an unambiguous manner to the level values of the rising branch of the predicted pressure profile EPD in the level range segment or level measuring zone B*. It indicates the presence of the second measuring range segment B on the sensor side. The time tC1 here marks the point of intersection of the second, higher threshold G2 with the estimated pressure profile curve EPD. The start of the scaling range C* is thus assigned to the time tC1. The level range segment C* finally ends at time tC1*, at which the upper threshold G2 intersects the falling edge of the estimated pressure profile signal EPD. The time interval between the times tC1 and tC1* indicates the presence of the third measuring range segment C on the sensor side. This assignment between the scaling zones A*, B*, C* and the time intervals for their periods of validity applies correspondingly to the falling edge of the predicted cylinder pressure signal EPD. The time tC1* thus determines the start of the second scaling zone B*. The time tB1* characterizes the change from scaling zone B* to scaling zone A*. In the exemplary embodiment here the scaling zone A* specifically represents the lowest level values p of the predicted pressure profile EPD between 0 and 3 bar. The second scaling zone B* characterizes central level values p of the predicted pressure profile EPD between 3 and 20 bar. The third scaling zone C* represents the highest level values p of the predicted cylinder pressure profile EPD above 20 bar.

Because the predicted cylinder pressure profile EPD is divided in the control device CU by the same level thresholds G1, G2 as on the sensor side into level measuring ranges or scaling zones A*, B*, C* and periods of validity or crankshaft angle ranges corresponding hereto are assigned to these scaling zones A*, B*, C*, it is now possible to identify the associated active scaling zone A, B, C for the respective output signal SS of the cylinder pressure sensor DS, modified by level reduction, in the control device CU. It is then possible, from the level values U of the measured, level-limited sensor output signal SS, by correct temporal assignment of the measuring range segment or scaling zone A, B, C, with which the level of the raw sensor signal ZS was originally reduced on the sensor side in the actual path IP, to recover the actual level value p* for the internal cylinder pressure by inverting the respective scaling. This is carried out in step S6 in FIG. 1 and shown with reference to a p*/t (pressure/time) diagram in step S10.

In the exemplary embodiment here the scaling zone A is assigned to the time interval between time t0 and time tB1. This means that during this time interval the cylinder pressure sensor DS supplies an output signal SS, which is subject to the scaling factor, in particular the offset, of this level zone A. This relationship means that it is possible to reverse or invert the original scaling, carried out by the evaluation/logic unit LE of the cylinder pressure sensor DS, again and to reconstruct or regenerate voltage values of the original raw sensor signal ZS from the voltage values U resulting for the sensor output signal SS in the time period between t0 and tB1. Corresponding internal pressure values p* in the combustion chamber of the cylinder CY can then be assigned correspondingly to these. Correspondingly the time interval between the times tB1 and tC1 determines the period of validity, in other words the presence of voltage level values in the level-reduced sensor output signal SS, which have been modified using the scaling factor of the second scaling zone B. The scaling carried out can correspondingly be calculated out, in other words the level values p* of the original raw sensor signal ZS can be recovered, by adding the offset of the measuring range segment B, which this has compared with the first measuring range segment A, to the voltage values U of the output signal SS. These recovered or reconstructed voltage level values correspond to internal pressure level values p* in the cylinder CY. The time interval between the times tC1 and tC1* finally determines the period of validity for the scaling zone C. Recovery of the voltage values U of the sensor output signal SS output during this time interval is then possible by inverting the scaling factor for the scaling zone C, so that the actual pressure values p* can similarly be recovered from the transmitted output signal values of the level-limited output signal SS. In particular the offset of the third measuring range segment C, which this has compared with the first measuring range segment A, is added to the voltage values U of the output signal SS.

If it is determined in step S6 that the start time or end time of the respective scaling zone A, B, C of the output sensor signal SS differs from those of the level range segments A*, B*, C* of the predicted expectation pressure profile EPD, in other words their periods of validity are different, this information can be used to adapt the performance characteristic information KI. This is carried out in step S11 in FIG. 1. For example the start of the scaling zone B of the level-limited output signal SS at time tB1** can be different from the estimated start tB1 of the scaling zone B* of the predicted pressure profile EPD. Correspondingly a difference can result between the start time tC1** for the third measuring range segment C for the measured, level-limited sensor output signal SS and the estimated start time tC1 for the predicted pressure profile EPD. This difference or deviation information is then used in step S11 to correct the performance characteristic information KI, in order to be able to determine an associated, expected pressure profile largely corrected of errors for the next operating point determination.

Figure 3:
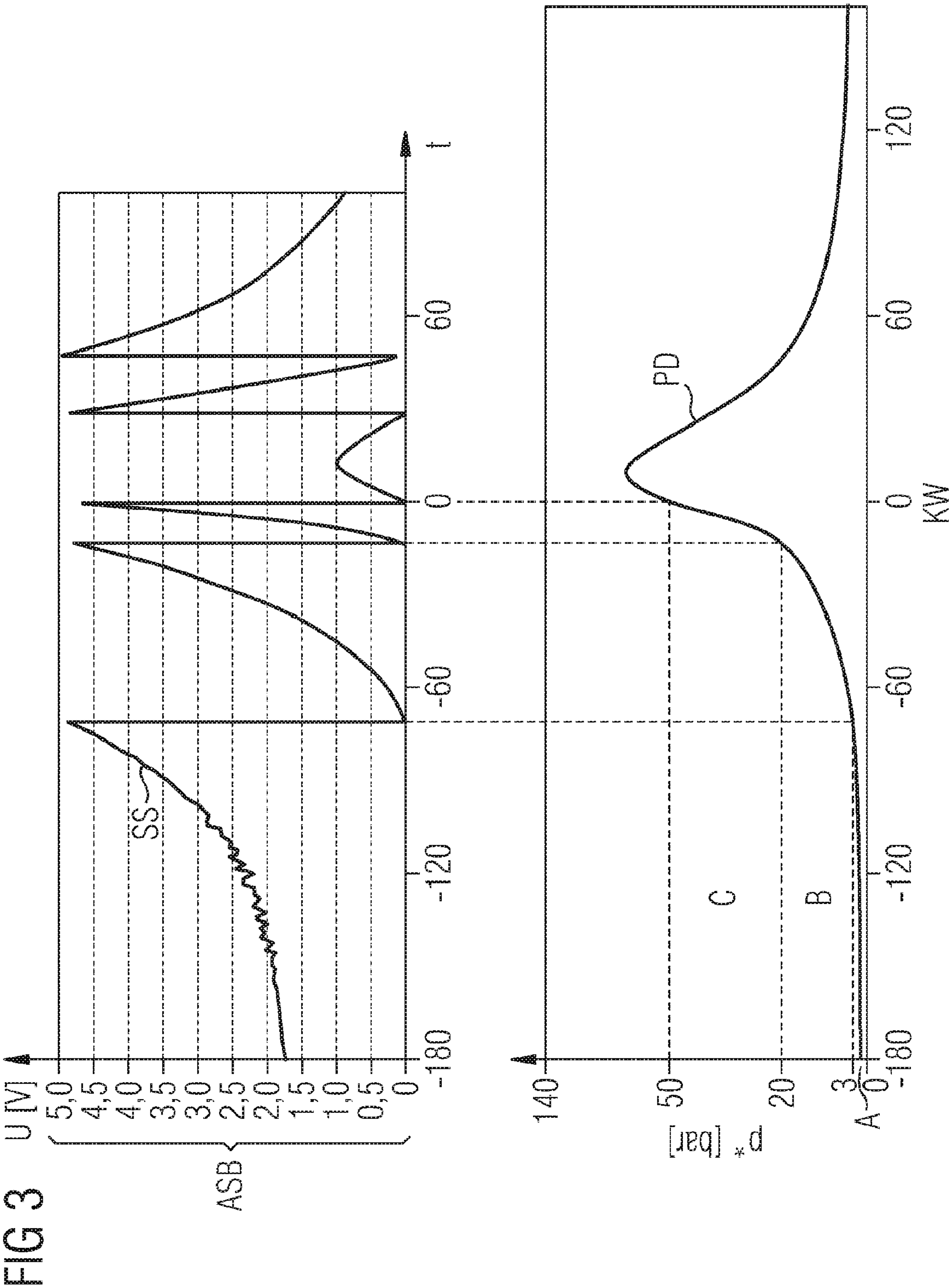

FIG. 3 shows an enlarged representation of the voltage level profile U of the output signal SS as a function of the crankshaft angle KW. This corresponds to the time t. A level limit range ASB between 0 and 5 volts is predefined for the level values U. To this end the original raw sensor signal ZS is divided in the logic/evaluation unit LE into the various measuring range segments A, B, C and a specific offset, which transfers each measuring range segment A, B, C into the required level limit range ASB, is deducted respectively from its level values. In the lower part of FIG. 3 the pressure profile PD thus reconstructed is assigned to the level profile of the level-limited output signal SS as a function of the crankshaft angle KW in a pressure/crankshaft angle (p*/KW) diagram.

Alternatively it may be necessary in some instances to calculate the expected cylinder pressure profile for the respectively current operating point directly without performance characteristic information. To this end it may be expedient for example to calculate the expected temporal pressure profile subject to a polytropic compression or expansion, with $p \times V^n$=constant, where n is a so-called polytropic exponent, segment by segment. An advantageous calculation method is specified for this in particular in the earlier patent application DE 10 2005 009 104.0.

To summarize, to increase sensor signal resolution and therefore sensor signal accuracy in this manner, it is not necessary to provide additional control lines between the cylinder pressure sensor and the engine control device, which otherwise would mean an unwanted outlay for control information generation, transmission and processing. Instead the sensor measuring range of the cylinder pressure sensor is divided into at least two appropriate individual ranges, for example a high-pressure and a low-pressure range. The switch from one range to the other takes place in the cylinder pressure sensor itself, whenever a measuring range boundary is reached or exceeded or fallen below. In the exemplary embodiment in FIG. 1 for example a measuring range switch takes place from scaling zone A to scaling zone B at 3 bar. The change from scaling zone B to scaling zone C is triggered when a threshold is exceeded at 20 bar.

It can also be advantageous, when switching from one scaling range to an adjacent scaling range, to provide a specific hysteresis, to prevent jitter between these two measuring ranges, when the current measured value of the output signal of the cylinder pressure sensor lies on the boundary or at the threshold between these two measuring ranges. A level value of 0.2 bar can be provided as the hysteresis or tolerance level for example. With reference to the above example, this means that as the pressure rises, the switch from the smallest measuring range A to the next measuring range up B takes place at around 3.2 bar, the switch back from the central, second measuring range B to the smallest, first measuring range A as the signal level of the output signal SS drops however only takes place at 2.8 bar.

The individual measuring ranges and their respective amplification factors and/or offsets (or even complete characteristic sensor curves) are stored in the engine controller (ECU) preferably in a non-volatile memory. The engine controller decides advantageously based on a specific pressure profile expectation which measuring range is active at the time. A typical cylinder pressure profile results as a function of the engine operating point, which is determined for example by the current rotation speed of the crankshaft of the internal combustion engine and the effective load, in particular the position of the throttle valve in the intake manifold of the internal combustion engine, and/or further operating parameters, such as injection timing, ignition angle, engine operating temperature, etc. This pressure profile is stored in the engine controller, for example as performance characteristics over the crankshaft angle. It is however in some instances also expedient for the estimated pressure profile to be calculated by means of a simple calculation method, e.g. subject to a polytropic compression or expansion, with $p \times V^n$=constant, where n is a polytropic exponent, segment by segment. Of course there may be deviations from one cycle of the combustion process to another in practice. It is therefore expedient to define the individual measuring ranges as A, B, C for example, so that the expected pressure fluctuations lie within the respective measuring range. The engine controller then selects the respective measuring range according to its expectation, obtains information about offset and/or amplification with a linear signal profile and can assign a level-limited pressure value to the respective sensor value output by the cylinder pressure sensor. A voltage, electric current, etc. can serve as the sensor value. In one particularly simple, expedient variant for a 4-stroke method of an internal combustion engine the 720° crankshaft angles are divided into 2×360° crankshaft angles. The low-pressure range is then assigned to the first 360° crankshaft angle range and the high-pressure range to the second 360° crankshaft angle range. The corresponding measuring range is then selected as a function of the crankshaft position.

Naturally the method can also advantageously be applied to sensor signals other than cylinder pressure signals, if there is a sufficiently predictable signal profile.

With the procedure according to an embodiment for increasing the resolution of sensor signals much more efficient utilization and an increase in the accuracy of the sensor analog signal results. The signal to noise ratio and resolution are significantly improved, so that it only then becomes possible to detect even physically small measuring ranges accurately or at all. The method also represents an economical solution, as it is not necessary to transmit information between the sensor and the engine control device, with the result that no additional signal generation or transmission is required. All the necessary information is already present in the engine controller. The method is particularly advantageous, when the sensor signal is used to regulate the combustion process. The so-called CAI (controlled auto ignition) method can be managed better as a result, as a higher-resolution cylinder pressure signal is present, which is used as a base variable for combustion process regulation, as it is necessary here to detect both the low-pressure and high-pressure ranges as accurately as possible.

What is claimed is:

1. A method for increasing the resolution of output signals from at least one measuring sensor for an internal combustion engine, comprising the steps of:

dividing the working level range of the measuring sensor, within which the level values of its raw sensor signal lie, into at least two measuring range segments, assigning the same predefined output level range of the output signal of the measuring sensor, which is limited compared with the working level range, to each measuring range segment, wherein the measuring sensor switches from one measuring range segment to the other when a measuring range boundary between two adjacent measuring range segments is reached, exceeded, or fallen below, determining the operating point of the internal combustion engine by means of an engine controller based on one or more operating parameters of the internal combustion engine for its combustion process, predicting the temporal profile of the raw sensor signal of the measuring sensor from at least one performance characteristic information item for the currently determined operating point, and determining by the engine controller which measuring range segment of the measuring sensor is currently activated based on this predicted temporal raw sensor signal profile.

2. The method according to claim 1, wherein a cylinder pressure sensor, which is attached to at least one cylinder of the internal combustion engine, is used as the measuring sensor and a voltage signal is generated by the cylinder pressure sensor as the raw sensor signal, representing the internal pressure in the cylinder.

3. The method according to claim 1, wherein the predicted temporal raw sensor signal profile is determined based on a previously determined operating point of the internal combustion engine.

4. The method according to claim 1, wherein the predicted raw sensor signal profile is calculated in the engine controller.

5. The method according to claim 1, wherein a specific hysteresis is provided when switching from one measuring range segment to another measuring range segment in order to prevent jitter between the two measuring range segments.

6. The method according to claim 1, wherein a division into at least two level range segments, which corresponds essentially to the division of the measuring range segments of the measuring sensor, is carried out in the engine controller for the predicted raw sensor signal profile.

7. The method according to claim 1, wherein the difference between the period of validity of the respective level range segment of the predicted raw sensor signal profile and the period of validity of the level-limited output signal of the measuring sensor is used to correct the prediction of the raw sensor signal profile adaptively for the next estimation.

8. A control device with at least one calculation unit, operable to increase the resolution of output signals from at least one measuring sensor for an internal combustion engine, the control device being operable to:

divide the working level range of the measuring sensor, within which the level values of its raw sensor signal lie, into at least two measuring range segments, assign the same predefined output level range of the output signal of the measuring sensor, which is limited compared with the working level range, to each measuring range segment, wherein the measuring sensor switches from one measuring range segment to the other being when a measuring range boundary between two adjacent measuring range segments is reached, exceeded or fallen below, wherein the operating point of the internal combustion engine is determined by means of an engine controller based on one or more operating parameters of the internal combustion engine for its combustion process, and to predict the temporal profile of the raw sensor signal of the measuring sensor from at least one performance characteristic information item for the currently determined operating point, wherein the engine controller determines which measuring range segment of the measuring sensor is currently activated based on this predicted temporal raw sensor signal profile.

9. The device according to claim 8, comprising a cylinder pressure sensor, which is attached to at least one cylinder of the internal combustion engine, and which is used as the measuring sensor and a voltage signal is generated by the cylinder pressure sensor as the raw sensor signal, representing the internal pressure in the cylinder.

10. The device according to claim 8, wherein the predicted temporal raw sensor signal profile is determined based on a previously determined operating point of the internal combustion engine.

11. The device according to claim 8, wherein the predicted raw sensor signal profile is calculated in the engine controller.

12. The device according to claim 8, wherein a specific hysteresis is provided when switching from one measuring range segment to another measuring range segment in order to prevent jitter between the two measuring range segments.

13. The device according to claim 8, wherein a division into at least two level range segments, which corresponds essentially to the division of the measuring range segments of the measuring sensor, is carried out in the engine controller for the predicted raw sensor signal profile.

14. The device according to claim 8, wherein the difference between the period of validity of the respective level range segment of the predicted raw sensor signal profile and the period of validity of the level-limited output signal of the measuring sensor is used to correct the prediction of the raw sensor signal profile adaptively for the next estimation.

* * * * *